Aug. 13, 1963

O. J. BEDRIJ 3,100,835

SELECTING ADDER

Filed Jan. 6, 1960

INVENTOR
OREST J. BEDRIJ

BY *Geoffrey Knight*
ATTORNEY

Aug. 13, 1963   O. J. BEDRIJ   3,100,835
SELECTING ADDER
Filed Jan. 6, 1960   7 Sheets-Sheet 3

Aug. 13, 1963  O. J. BEDRIJ  3,100,835
SELECTING ADDER
Filed Jan. 6, 1960  7 Sheets-Sheet 5

O. J. BEDRIJ 3,100,835

SELECTING ADDER

Filed Jan. 6, 1960

Aug. 13, 1963   O. J. BEDRIJ   3,100,835
SELECTING ADDER

Filed Jan. 6, 1960   7 Sheets-Sheet 7

United States Patent Office 3,100,835  
Patented Aug. 13, 1963

3,100,835  
SELECTING ADDER  
Orest J. Bedrij, Poughkeepsie, N.Y., assignor to International Business Machines Corporation, New York, N.Y., a corporation of New York  
Filed Jan. 6, 1960, Ser. No. 839  
4 Claims. (Cl. 235—175)

This invention relates to digital computers and more particularly to digital adders.

In an elementary digital adder, the time required to add two numbers having a large number of digits is dependent upon the time required for the propagation of carries from the least significant to the most significant digit. The generation of sums for each digital position proceeds sequentially from the least significant to the most significant position, each sum being generated only after a signal is present which indicates whether or not the addition in the previous digital positions produced a carry.

More advanced schemes provide means for increasing the speed of the addition. The system described in The National Bureau of Standards Circular 591 shows a scheme whereby the system first determines if there is a carry into each of a plurality of digital positions, and then simultaneously generates the sum of each of these digits based upon the previous determination as to the existence of a carry into each digital position. However, when applied to numbers which have a large number of digital positions, the speed of such systems remains limited due to the limitations inherent in the physical circuits which are available. Circuits of the above type which are designed to add numbers which have a large number of digital positions essentially break the digital positions of the numbers to be added into groups. The carries within each group are generated simultaneously; however, the various groups operate sequentially.

The systems herein described overcome the problem of carry propagation delay by dividing the digital positions of the addend and augend into a plurality of groups, each group thereby having a subaugend and corresponding subaddend. During the first step in the operation, the subaugends and corresponding subaddends are simultaneously added twice, thereby producing two subsums. One addition assumes that there was a carry into each group, and the second addition assumes that there was no carry into each group. During the second step in the operation, the correct subsums for all groups are simultaneously selected.

It is the object of the present invention to provide a faster adder circuit.

A further object is to provide a faster adder circuit using a minimum number of components.

A further object is to provide an improved adder check circuit.

A further object is to provide an adder circuit which can readily be broken into units for packaging.

The foregoing and other objects, features and advantages of the invention will be apparent from the following more pratical description of the preferred embodiments of the invention, as illustrated in the accompanying drawings.

The invention will first be described in a general way with reference to the simplified embodiment shown in FIG. 1. With this simplified embodiment a fifteen digit addend $A_{1 \text{ to } 15}$ can be added to a fifteen digit augend $B_{1 \text{ to } 15}$ thereby producing a fifteen digit true sum $S_{1 \text{ to } 15}$. Provision is also made for a carry input $C_0$ to the least significant digital position. The carry $C_0$ is known in the art as an end around carry and it is used when adding a negative number, which is in complement form, to a positive number.

The digits of the numbers to be added are broken down into groups. In the embodiment shown in FIG. 1, the fifteen bit augend and the fifteen bit addend are broken into three groups, $a$, $b$ and $c$, each group thereby having a subaugend, a subaddend, and a true subsum of five digital positions.

In order to facilitate an understanding of the invention, the following descriptive numbering scheme will be used throughout. Augend, addend, and true sum digits will respectively be designated by an A, B or S, followed by a subscript to designate a digital position (e.g., $S_{12}$ for the twelfth true sum digit). Carries will be designated by a capital C followed by a subscript to designate which digital position generated the carry (e.g., $C_5$ is a carry out of the fifth digital position). An S or C which is followed by a $y$ or $n$ in the subscript indicates that such sum or carry digit is only provisional and that it has been generated under some assumption. The subscript $y$ indicates an assumption that there was a carry into some previous digital position and the subscript $n$ indicates an assumption that there was not a carry into some previous digital position. As will be seen later the assumption relates to the presence of a carry into the lowest order digital position of the minor digital group under consideration. The absence of an $n$ or $y$ in the subscript indicates that it is the true sum or true carry.

Figure 1:
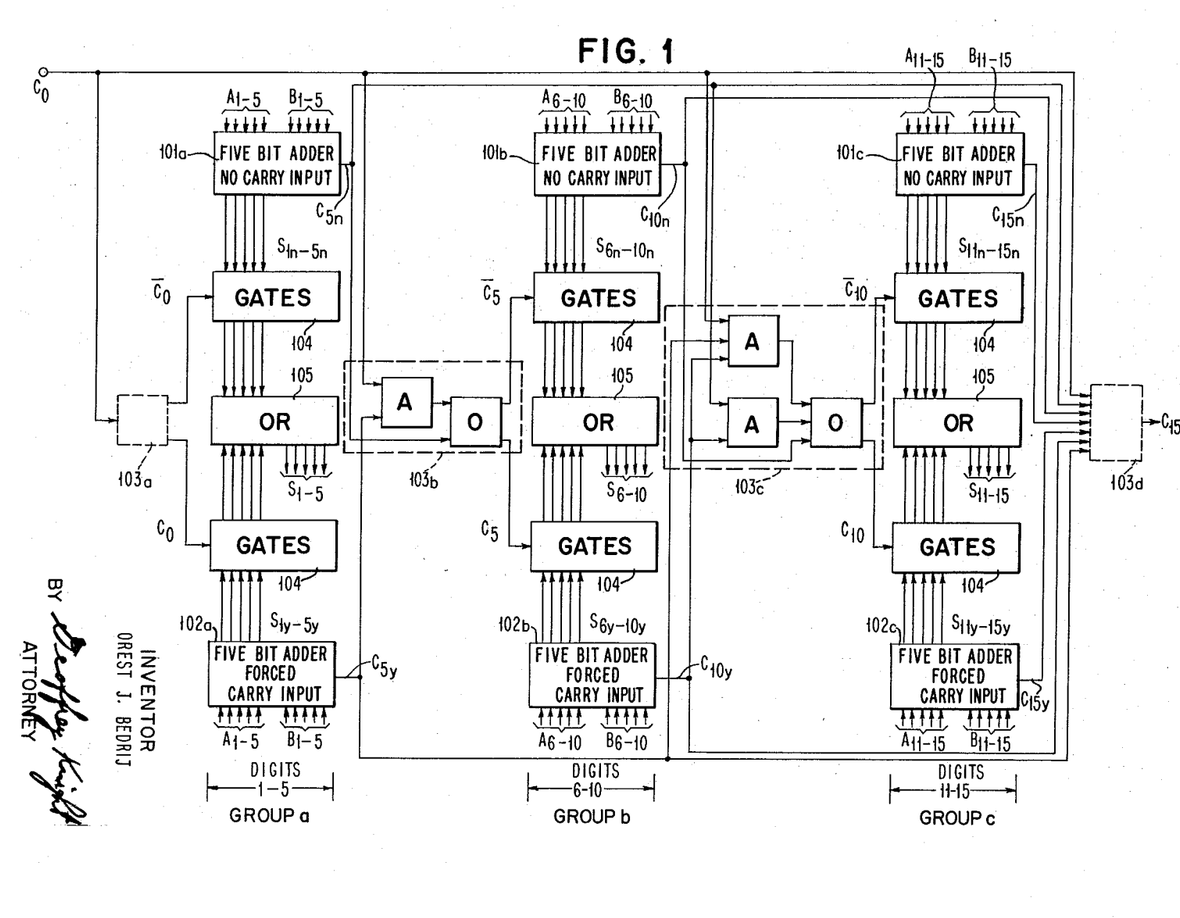
FIG. 1 is a block diagram of a simplified embodiment of the invention.
Figure 4A:
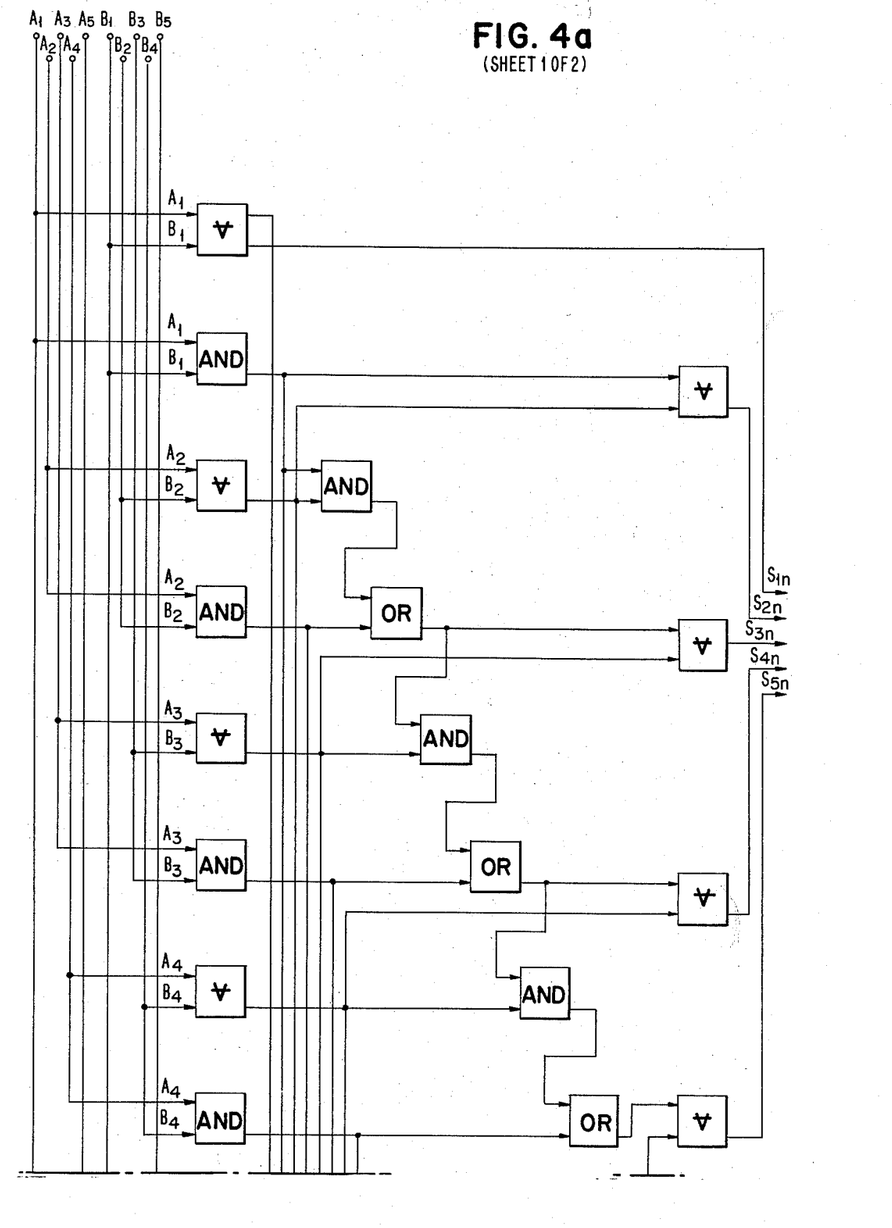
FIGS. 4a and 4b are circuit diagrams of a five bit adder module shown in FIG. 3.
Figure 4B:
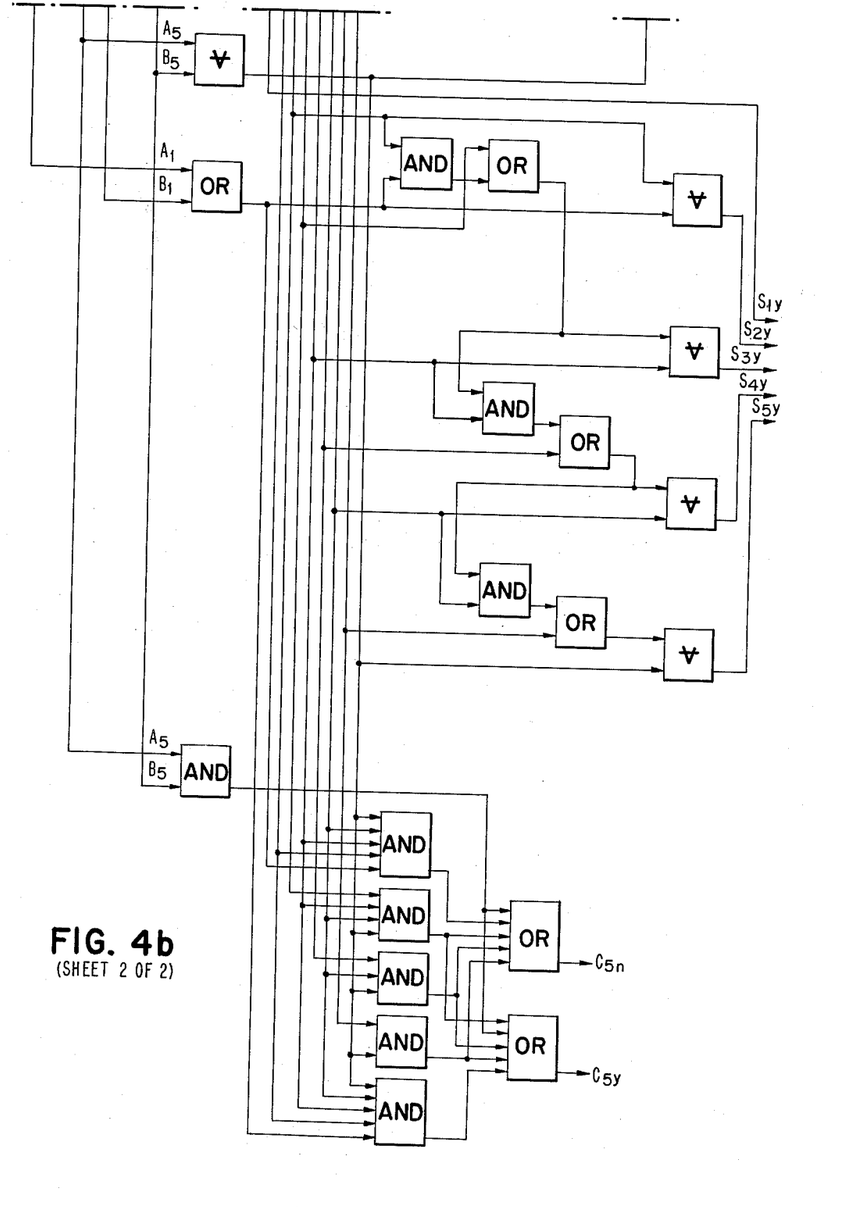

In FIG. 1 blocks 101a, 101b, 101c, 102a, 102b and 102c each represent five bit conventional logical adders. Each adder may consist, for example, of five sequentially connected full adders of the type shown within the dotted lines in FIGS. 4-1 or 4-2, on pages 84 and 85, respectively, of Arithmetic Operations in Digital Computers by R. K. Richards, D. Van Nostrand Company, Inc., New York, 1955.

All the adders 101a, b and c and 102a, b and c operate simultaneously, adders 101a, 101b, and 101c operate with no carry input to the least significant digital position of their respective groups, while adders 102a, 102b and 102c operate with a forced carry input to the least significant digital position of the respective groups. The adders 101a, 101b and 101c respectively produce sum digits $S_{1n \text{ to } 5n}$, $S_{6n \text{ to } 10n}$ and $S_{11n \text{ to } 15n}$ and output carries $C_{5n}$, $C_{10n}$ and $C_{15n}$. Likewise adders 102a, 102b and 102c respectively produce sum digits $S_{1y \text{ to } 5y}$, $S_{6y \text{ to } 10y}$ and $S_{11y \text{ to } 15y}$ and output carries $C_{5y}$, $C_{10y}$ and $C_{15y}$.

Figure 6:
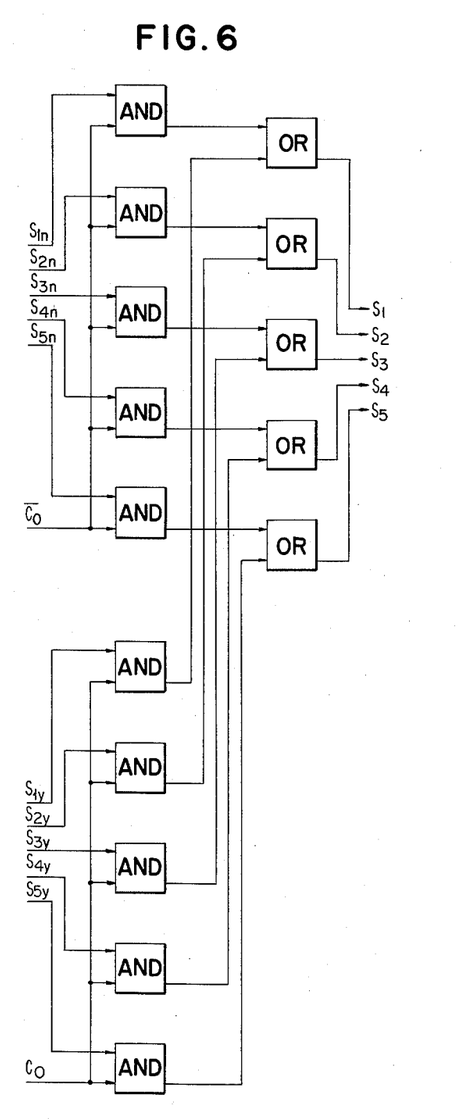
FIG. 6 is a circuit diagram of the sum gates shown in FIG. 3.

From the first group, either sum digits $S_{1y \text{ to } 5y}$ or sum digits $S_{1n \text{ to } 5n}$ are gated by AND gates 104 through OR circuits 105 to the output, depending upon whether or not there is a carry input $C_0$ into the first group. Likewise either digits $S_{6y \text{ to } 10y}$ or digits $S_{6n \text{ to } 10n}$ from the second group and digits $S_{11y \text{ to } 15y}$ or digits $S_{11n \text{ to } 15n}$ from the third group are gated to the output depending upon whether $C_5$ and $C_{10}$ respectively are present. Circuits 104 and 105 combined are identical to circuits 122 of the second embodiment which are shown in FIG. 6 and which will be explained in detail later.

The carries $C_0$, $C_5$, $C_{10}$ and $C_{15}$ are produced by circuits 103a, 103b, 103c and 103d. Circuit 103a merely examines whether or not there is a carry input $C_0$ to the circuit and it then accordingly generates output $C_0$ or $\overline{C_0}$ (not $C_0$). Circuit 103b examines the carry input $C_0$ and the carry outputs $C_{5y}$ and $C_{5n}$ from adders 101a and 102a to determine if there is a carry $C_5$. Circuit 103b comprises a plurality of AND and OR gates interconnected in accordance with the Boolean equation $C_5 = C_{5n} + C_0 C_{5y}$. Likewise circuits 103c and 103d examine the circuit input carry $C_0$ and the carries from each of the previous adders and produce carries $C_{10}$ and $C_{15}$. Circuits 103c and 103d comprise a plurality of AND and OR gates interconnected in accordance with the following Boolean equations:

$$C_{10} = C_0 C_{5y} C_{10y} + C_{5n} C_{10y} + C_{10n}$$

and $$C_{15} = C_0 C_{5y} C_{10y} C_{15y} + C_{5n} C_{10y} C_{15y} + C_{10n} C_{15y} + C_{15n}$$

Circuit 103d is identical to circuit 121d shown in FIG. 5.

The operations of the adders 101 and 102 proceed simultaneously and likewise, all of the circuits 103 operate simultaneously. (Note, where a plurality of similar circuits are each identified by a numeral followed by a different lower case letter, a reference to the numeral is a reference to all such circuits.) The addition proceeds essentially in two steps, first each subaddend and subaugend is added twice, one addition by adders 102 assuming that there was a carry into each group and the second addition by adders 101 assuming that there was no carry into each group. In the second step the true subsum for each group is gated to the output by circuits 103 and 104 depending upon whether or not there actually was a carry into that group. If a special type of adder is used the output carries $C_{5y}$, $C_{5n}$, $C_{10y}$, $C_{10n}$, $C_{15y}$ and $C_{15n}$ can be produced more quickly than the sum digits $S_{1n\ to\ 15n}$ and $S_{1y\ to\ 15y}$ and hence circuits 103 can start operating before the sum digits are produced. This will be more thoroughly and clearly explained later with reference to the preferred embodiment.

The basic circuit arrangement shown in FIG. 1 could be extended to include any number of groups; however, the control circuits 103 for circuits beyond the fourth or fifth level would become exceedingly complex and costly, hence, a multilevel system, an example of which is shown by the preferred embodiment, is preferable.

A second and preferred embodiment of the invention showing a multilevel system as applied to a one hundred digit adder is shown in FIGS. 2, 3, 4, 5, 6, 7, 8 and 9. The digital positions of the addend $A_{1\ to\ 100}$ of the augend $B_{1\ to\ 100}$ and of the sum $S_{1\ to\ 100}$ are divided into four major digit groups, 110a, 110b, 110c and 110d (FIG. 2); each major digit group is in turn divided into five minor digit groups 111a, 111b, 111c, 111d and 111e (FIG. 3), each minor digital group having five digital positions. These major and minor digit groups may also be referred to as first and second level groups, respectively.

Figure 2:
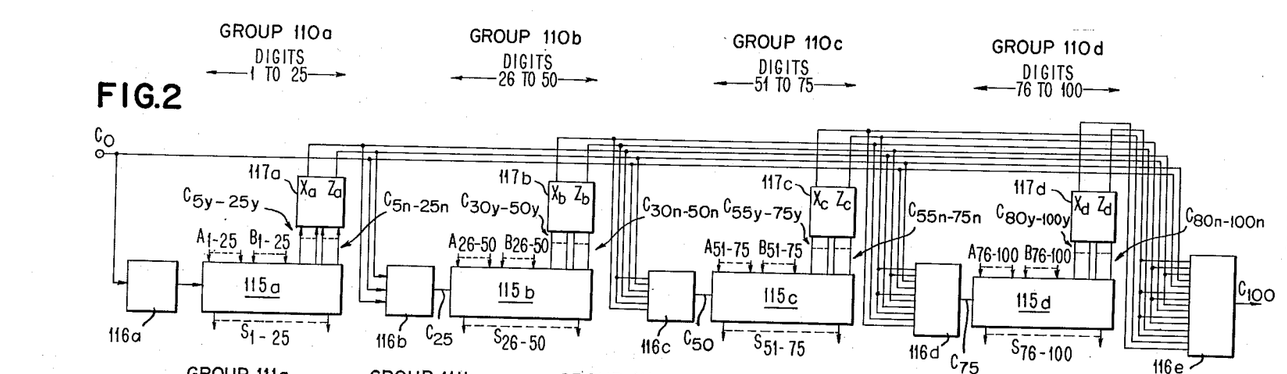
FIG. 2 is a block diagram showing the overall organization of a preferred embodiment of the invention.
Figure 3:
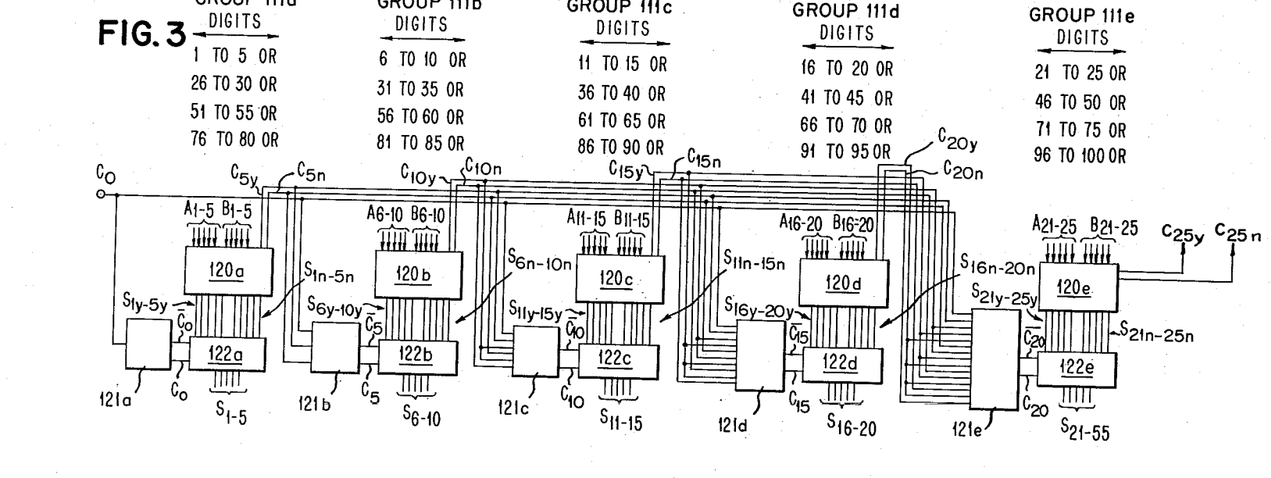
FIG. 3 is a block diagram showing the general organization of one of the first level groups, shown in FIG. 2.

FIG. 2 shows the general organization of the four major digit groups 110a, 110b, 110c and 110d, each major digit group 110 having components 115, 116 and 117. FIG. 3 shows the general organization of each circuit 115. Each circuit 115 has five sets (a, b, c, d and e) of components 120, 121, and 122 (corresponding to the five minor digit groups).

Figure 7:
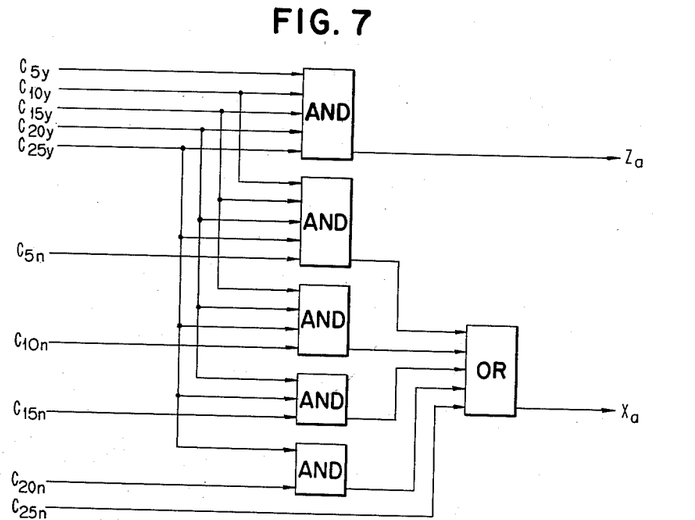
FIG. 7 is a circuit diagram of one of the carry look-ahead circuits shown in FIG. 2.

The circuit shown in FIG. 3 is the circuit 115a for major digit group 110a; however, the other circuits 115b, 115c and 115d have circuits identical to the one shown here for group 115a. FIGS. 8a to 8e show the organization of circuits 116a, 116b, 116c and 116d. FIG. 7 shows the organization of circuit 117a. Circuits 117b, 117c and 117d, are identical to circuit 117a. FIGS. 4a and 4b show the organization of a circuit 120a. The circuits 120b, 120c, 120d and 120e are identical to circuit 120a.

FIGS. 5a to 5e show the organization of each of the circuits 121 and FIG. 6 shows the organization of circuits 122.

In general, each of the major digit groups operates as follows: the five circuits 120, each of which is associated with a particular set of five digital positions (a minor group) generates two sets of sum digits, $S_n$ and $S_y$, for the respective minor group of digital positions, one set of sum digits $S_n$ being generated under the assumption that there was no carry into the least significant digital position of the respective minor group of digital positions, and the second set of sum digits $S_y$ being generated under the assumption that there was a carry into the least significant digital position of the respective minor digit group. The circuits 120 also produce outputs $C_y$ and $C_n$ which indicate whether there is a carry out of the highest digital position of the respective minor digit group. Circuits 121 examine the carry input to the major digit group and the $C_n$ and $C_y$ carry outputs from all the minor digit groups of lower digital order in the respective major group, and produce a carry signal indicative as to whether or not there actually should be a carry into the lowest digital order of the associated minor digit group; said signal then operates circuit 122 to either gate the $S_n$ or $S_y$ digits to the output.

By way of analogy to the first embodiment of the invention which is shown in FIG. 1 circuits 120 perform the combined function of circuits 101 and 102.

Each circuit 120 operates on five digital positions, e.g. $A_{1\ to\ 5}$ and $B_{1\ to\ 5}$, and makes available two sums, e.g. $S_{1y\ to\ 5y}$ and $S_{1n\ to\ 5n}$ one of which, i.e. $S_{1y\ to\ 5y}$, is produced assuming that there was a carry into that minor group and the other sum, i.e. $S_{1n\ to\ 5n}$, being produced on the assumption that there was not a carry into that minor group. Circuits 120 also produce two other outputs $C_y$ and $C_n$. These outputs are equivalent to the $C_{5y}$ and $C_{5n}$ carry outputs of adders 101 and 102 in FIG. 1.

The circuits 120 comprise the shown plurality (FIGS. 4a and 4b) of logical AND and OR blocks connected according to the Boolean equations given below. The AND and OR blocks shown may be of the well known type described in Digital Computer Components and Circuits, by R. K. Richards, pages 178–186, D. Van Nostrand Co., Inc., 1957.

Note, the symbol $\veebar$ denotes the exclusive OR function. That is, an output is generated if either, but not both of the input signals are present.

$S_{1y} = \overline{A_1 \veebar B_1}$
$S_{1n} = A_1 \veebar B_1$
$S_{2y} = A_2 \veebar B_2 \veebar C_{1y} = A_2 \veebar B_2 \veebar (A_1 + B_1)$
$S_{2n} = A_2 \veebar B_2 \veebar C_{1n} = A_2 \veebar B_2 \veebar (A_1 B_1)$
$S_{3y} = A_3 \veebar B_3 \veebar C_{2y} = A_3 \veebar B_3 \veebar [(A_1+B_1)(A_2 \veebar B_2) + A_2 B_2]$
$S_{3n} = A_3 \veebar B_3 \veebar C_{2n} = A_3 \veebar B_3 \veebar [A_1 B_1 (A_2 \veebar B_2) + A_2 B_2]$
$S_{4y} = A_4 \veebar B_4 \veebar C_{3y} =$
$\quad A_4 \veebar B_4 \veebar [(A_1+B_1)(A_2 \veebar B_2)(A_3 \veebar B_3)$
$\quad\quad\quad + A_2 B_2 (A_3 \veebar B_3) + A_3 B_3]$
$S_{4n} = A_4 \veebar B_4 \veebar C_{3n} = A_4 \veebar B_4 \veebar [A_3 \veebar B_3)(A_2 \veebar B_2) A_1 B_1$
$\quad\quad\quad + A_2 B_2 (A_3 \veebar B_3) + A_3 B_3]$
$S_{5y} = A_5 \veebar B_5 \veebar C_{4y} = A_5 \veebar B_5 [(A_1+B_1)(A_2 \veebar B_2)(A_3 \veebar B_3)$
$\quad (A_4 \veebar B_4) + A_2 B_2 (A_3 \veebar B_3)(A_4 \veebar B_4)$
$\quad\quad\quad + A_3 B_3 (A_4 \veebar B_4) + A_4 B_4]$
$S_{5n} = A_5 \veebar B_5 \veebar C_{4n} = A_5 \veebar B_5 \veebar [(A_4 \veebar B_4)(A_3 \veebar B_3)$
$\quad (A_2 \veebar B_2)(A_1 B_1) + A_4 \veebar B_4)(A_3 \veebar B_3)(A_2 B_2)$
$\quad\quad\quad + (A_4 \veebar B_4)(A_3 B_3) + A_4 B_4]$
$C_{5y} = (A_1+B_1)(A_2 \veebar B_2)(A_3 \veebar B_3)(A_4 \veebar B_4)(A_5 \veebar B_5)$
$\quad + A_2 B_2 (A_3 \veebar B_3)(A_4 \veebar B_4)(A_5 \veebar B_5) + A_3 B_3$
$\quad\quad (A_4 \veebar B_4)(A_5 \veebar B_5) + A_4 B_4 (A_5 \veebar B_5) + A_5 B_5$
$C_{5n} = A_1 B_1 (A_2 \veebar B_2)(A_3 \veebar B_3)(A_4 \veebar B_4)(A_5 \veebar B_5)$
$\quad + A_2 B_2 (A_3 \veebar B_3)(A_4 \veebar B_4)(A_5 \veebar B_5) + A_3 B_3$
$\quad\quad (A_4 \veebar B_4)(A_5 \veebar B_5) + A_4 B_4 (A_5 \veebar B_5) + A_5 B_5$ Two conventional adders such as 101 and 102 of FIG. 1 could be used, however, with conventional adders the carriers $C_{5y}$ and $C_{5n}$ would be produced only after all of the digital sums $S_{1n\ to\ 5n}$ and $S_{1y\ to\ 5y}$ had been produced, since in a conventional adder the sum and carry for each successive digital position is produced only after the addition of the previous digit is complete.

If the time required for one logical block to change state after a signal is applied is designated by T, the time after the $A_{1\ to\ 5}$ and $B_{1\ to\ 5}$ inputs are activated and before the carries $C_{5n}$ and $C_{5y}$ are available is 3T. The time after A and B signals are applied and before all the $S_n$ and $S_y$ digits are available is 8T. Hence, the operation of circuits 121 which determine whether circuit 122 should gate the $S_y$ digits or the $S_n$ digits to the output, can start operating before the sum digits $S_y$ and $S_n$ are available.

Circuits 121 which are shown in FIGS. 5a to 5e examine the carry outputs from all the previous adders and determine which sum digits $S_y$ or $S_n$ should be gated to the output. The circuits 121a, 121b, 121c, 121d and 121e comprise the shown plurality of logical AND and OR gates interconnected in accordance with the following Boolean equations wherein:

$C_0$ represents the carry into the lowest order digital position of the major group under consideration (e.g. in FIG. 3 we are showing major group 110a, hence, the carry input is $C_0$. If we were showing the second group, the carry input would be $C_{25}$, etc.).

$$C_0 = C_0$$
$$C_5 = C_{5y}C_0 + C_{5n}$$
$$C_{10} = C_0 C_{5y} C_{10y} + C_{5n} C_{10y} + C_{10n}$$
$$C_{15} = C_0 C_{5y} C_{10y} C_{15} + C_{5n} C_{10y} C_{15y} + C_{10n} C_{15y} + C_{15n}$$
$$C_{20} = C_0 C_{5y} C_{10y} C_{15y} C_{20y} + C_{5n} C_{10y} C_{15y} C_{20y}$$
$$+ C_{10n} C_{15y} C_{20y} + C_{15n} C_{20y} + C_{20n}$$

It is realized that certain functions in the equations for $S_n$, $S_y$, $C_n$ and $C_y$ are common to each equation and that a certain number of components could be saved by generating these functions only once; however, to facilitate the understanding and explanation of the invention, each of the circuits is described separately.

Figure 5A:
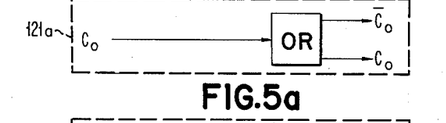
FIGS. 5a to 5e are circuit diagrams of the module carry input circuits shown in FIG. 3.
Figure 5B:
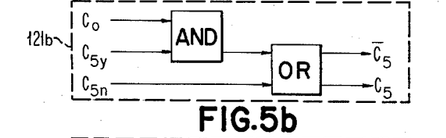
Figure 5C:
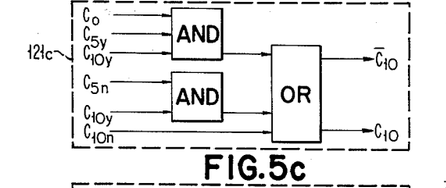
Figure 5D:
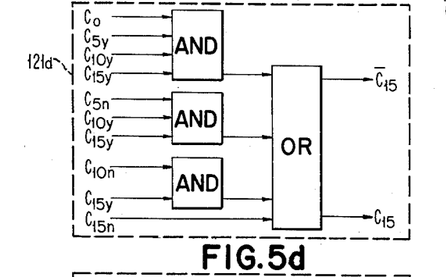
Figure 5E:
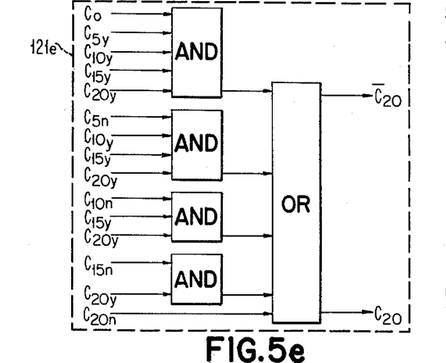

Circuit 121a is merely an inverter driver which has two outputs, the first output is logically identical to the input and the second output is the logical inverse of the input.

The circuitry for circuits 121 in the other major digital groups is identical to the circuitry here shown for major group 110a; however, the digital position designations would naturally be different. The designation for major group 110b would each be increased by twenty-five positions from that shown here, for major group 110c each designation would be increased by fifty digital positions from that shown here, and for major group 110d, each designation would be increased by seventy-five digital positions from that shown here. The OR logic blocks shown in FIGS. 5b, 5c, 5d and 5e perform a conventional OR function, that is, produce outputs $C_5$, $C_{10}$, $C_{15}$, and $C_{20}$, respectively, whenever at least one of the inputs is present. Further, each of these OR logic blocks incorporates additional well-known elements for producing a second output inverse to the normal output (i.e., $\overline{C_5}$, $\overline{C_{10}}$, $\overline{C_{15}}$, and $\overline{C_{20}}$, respectively). It is to be noted that the logic block of FIG. 5a receives only a single input, but since it produces the same logical result as the corresponding blocks in FIGS. 5b-5e, it is labeled as an OR block in order to preserve consistency in the sequence of logical functions shown in FIGS. 5a-5e.

Each circuit 122 (FIG. 6) has two AND circuits followed by an OR circuit for each digital position whereby either the $S_n$ or $S_y$ sum for the particular digital position can be gated to the output in accordance with whether the signal from the associated circuit 121 is $C_0$ or $\overline{C_0}$.

Thus far the discussion has been limited to one representative major digital group (i.e., 110a). The general scheme thus far shown, an example of which is represented by the organization of each major digital group and likewise by the scheme described in the first embodiment, could theoretically be extended to cover any number of digital positions; however, the circuits 121 would become exceedingly costly and complex.

One alternative would be to have a plurality of major digit groups which operate sequentially, the internal workings of each major digit group operating as hereinbefore described for major group 110a. However, a faster scheme is achieved by applying the principle of this invention on a two level basis as shown by the preferred embodiment. With reference to FIG. 2, each of the circuits 115 for major digit groups 110a, 110b, 110c and 110d operate as hereinbefore described for circuits 115a.

During the first step in the operation, all of the circuits 120 in each major group operate simultaneously, thereby first producing outputs $C_y$ and $C_n$ and later producing outputs $S_y$ and $S_n$. Since circuits 121 of the major groups 110a, 110b, 110c and 110d cannot operate until the respective signals $C_0$, $C_{25}$, $C_{50}$ and $C_{75}$ are present, during the second step in the operation the circuits 117 and 116 simultaneously produce outputs $C_0$, $C_{25}$, $C_{50}$ and $C_{75}$.

For example, circuits 117a (FIG. 7) examine outputs $C_{5y}$, $C_{10y}$, $C_{15y}$, $C_{20y}$, $C_{25y}$, $C_{5n}$, $C_{10n}$, $C_{15n}$, $C_{20n}$, $C_{25n}$, of the associated major group 110a and produce outputs $X_a$ and $Z_a$. The circuits 116 (FIG. 8) examine the $C_0$, X and Z outputs and produce the respective carries, $C_0$, $C_{25}$, $C_{50}$, and $C_{75}$.

Each circuit 117 comprises a plurality of AND and OR circuits connected in accordance with the following Boolean equations:

$$X_a = C_{10y}C_{15y}C_{20y}C_{25y}C_{5n} + C_{15y}C_{20y}C_{25y}C_{10n}$$
$$+ C_{20y}C_{25y}C_{15n} + C_{25y}C_{20n} + C_{25n}$$
$$Z_a = C_{5y}C_{10y}C_{15y}C_{20y}C_{25y}$$

All of the circuits 117 are identical. Circuits 116 (FIGS. 8a to 8e) comprise a plurality of AND and OR circuits connected in accordance with the following Boolean equations:

$$C_0 = C_0$$
$$C_{25} = C_0 Z_a + X_a$$
$$C_{50} = C_0 Z_a Z_b + X_a Z_b + X_b$$
$$C_{75} = C_0 Z_a Z_b Z_c + X_a Z_b Z_c + X_b Z_c + X_c$$
$$C_{100} = C_0 Z_a Z_b Z_c Z_d + X_a Z_b Z_c Z_d + X_b Z_c Z_d + X_c Z_d + X_d$$

Figure 8A:
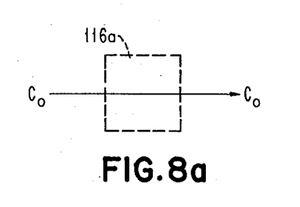
FIGS. 8a to 8e are circuit diagrams of the group carry input circuits shown in FIG. 2.
Figure 8B:
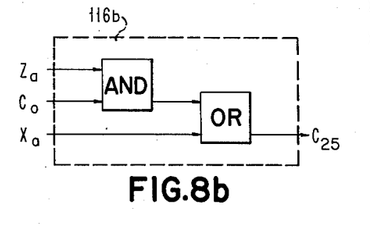
Figure 8C:
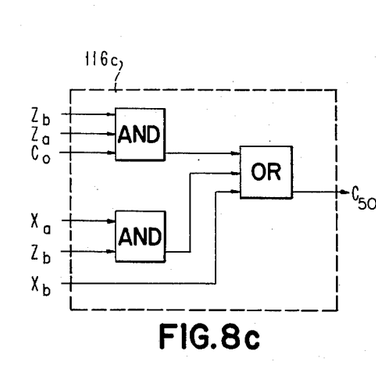
Figure 8D:
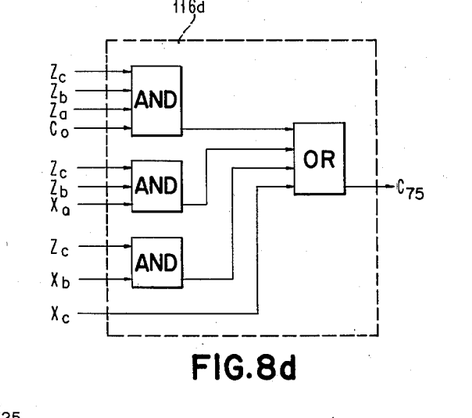
Figure 8E:
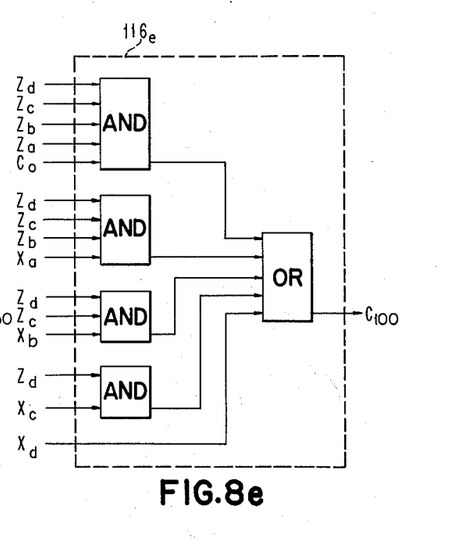

Circuit 116a may in reality be merely a direct connection, however, for consistency, a block marked 116a is shown.

During the third step in the operation each circuit 121 for each major digit group selects the correct subsums $S_y$ or $S_n$ for each minor group as hereinbefore described for group 110a.

For operation on numbers with a greater number of digital orders the principle herein described could be extended to three or more levels.

In certain applications of this system, the end around carry $C_0$ into the lowest order digital position will never occur; hence, there will be no need for adder 102a.

Figure 9:
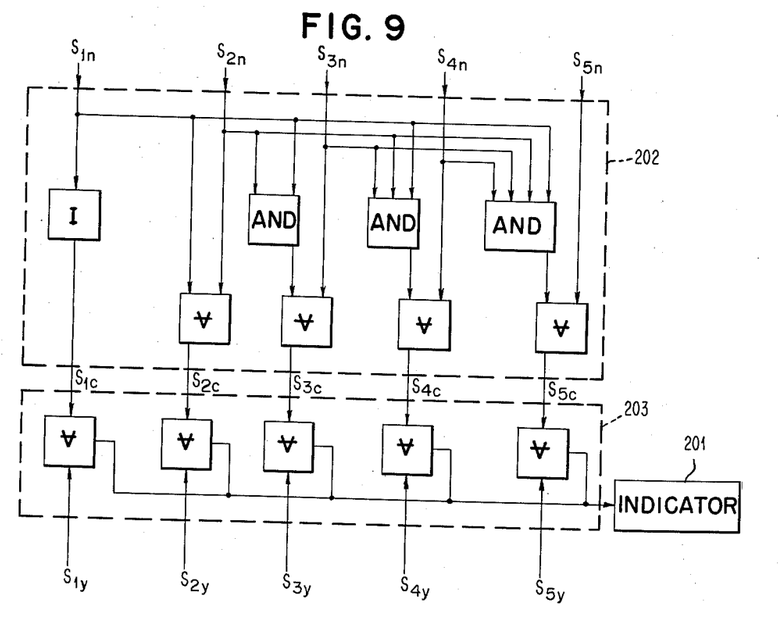
FIG. 9 is a circuit diagram of a checking circuit.

The checking feature (FIG. 9) of the invention will be explained with reference to the embodiment shown in FIG. 1; however, the checking feature is equally applicable to the second embodiment. Remembering that the difference between sums $S_n$ and $S_y$ is that the first sum $S_n$ was generated without a carry into the lowest order digital position and that the second sum was generated with a carry into the lowest order digital position, it is seen that the difference between the two sums for each minor group (e.g. $S_{1n\ to\ 5n}$ and $S_{1y\ to\ 5y}$) should be "one." Hence, the checking circuit essentially adds "one" to the $S_n$ sum and compares the result with $S_y$ sum. The indicator circuit 201 gives an indication of any discrepancy. Circuits 202 are conventional logical adders comprising a plurality of logical AND and OR circuits interconnected in accordance with the following Boolean equations:

$S_{1c} = \bar{S}_{1n}$
$S_{2c} = S_{1n} \not\equiv S_{2n}$
$S_{3c} = S_{3n} \not\equiv (S_{1n}S_{2n})$
$S_{4c} = S_{4n} \not\equiv (S_{1n}S_{2n}S_{3n})$
$S_{5c} = S_{5n} \not\equiv (S_{1n}S_{2n}S_{3n}S_{4n})$ Circuits 203 are conventional NOT AND circuits, one for each digital position, which give an output if there is a difference between the $S_c$ and $S_y$ signals.

The circuits shown herein are merely illustrative and the number of digital positions per group, the number of groups, and the number of levels of groups could be changed to meet special requirements without departing from the spirit of the invention disclosed and claimed herein.

A further advantage of the adder disclosed herein is its adaptability to the packaging techniques used in digital computers. Each five bit module can be placed on one or two printed circuits thus providing a readily distinct unit for packaging.

While the invention has been particularly shown and described with reference to preferred embodiments thereof, it will be understood by those skilled in the art that the foregoing and other changes in form and details may be made therein without departing from the spirit and scope of the invention.

I claim:

1. In a logical adder the combination of input means for supplying voltage signals representative of augend and addend digits, output means the voltage states of which represent sum digits, said input and output means being divided into a plurality of first level groups, each of said first level groups in turn being divided into a plurality of second level groups, each of the second level groups thereby having input means for supplying voltage signals representative of a subaugend and a corresponding subaddend, and output means the voltage state of which represents true subsum digits; first means associated with each of said second level groups responsive to said subaugend and subaddend input means for producing voltage signals representative of a first subsum and a first group carry output, said first group carry output being generated simultaneously for all groups; second means associated with each of said second level groups responsive to said subaugend and subaddend input means for producing simultaneously with said first means voltage signals representative of a second subsum higher by one than said first subsum and for producing voltage signals representative of a second group carry output, said second group carry output being generated simultaneously for all groups; means associated with each of said first level groups responsive to the group carry output signals from second level groups having digital positions of lower digital order for producing a respective carry input signal into each first level digital group; and means within each of said first level groups respectively responsive to said carry input signals and to the group carry outputs from second level groups within the respective first level group which have digital positions of lower digital order to select the subsum for each second level group corresponding to the true subsum.

2. In a logical adder the combination of input means for supply voltage signals representative of augend and addend digits, output means the voltage states of which represent sum digits, said input and output means being successively subdivided a plurality of times thereby forming groups within groups in a plurality of size levels, the smallest groups thereby having input means for supplying voltage signals representative of a subaugend and a corresponding subaddend and output means the voltage states of which represent true subsum digits, first means associated with each of the smallest groups responsive to said subaugend and subaddend input means for producing voltage signals representative of a first subsum and a first group carry output, second means associated with each of the smallest groups responsive to said subaugend and subaddend input means for producing simultaneously with said first means voltage signals representative of a second subsum higher by one than said first subsum and for producing voltage signals representative of a second group carry output; means for each group in each level, except the lowest, respectively responsive to the group carry outputs from lowest level groups respectively having digital positions of lower digital order than the digital positions of the respective group for generating carries into the respective groups in each level except the lowest, said carries being generated simultaneously for groups in like levels; and means in each group of lowest level groups responsive to the respective group carry input and to group carry outputs of lowest level groups within the respective group having digital positions of lower digital order to select the subsum corresponding to the true subsum for each lowest level digital group.

3. An adder wherein the digital positions of the augend, addend, and sum are divided into a plurality of groups, each of said groups thereby having a subaugend, a corresponding subaddend, and a true subsum, means for generating a first subsum and a first group carry output from each subaugend and corresponding subaddend without a carry into the least significant digital order of each group, means for simultaneously generating a second subsum and a corresponding second group carry output for each subaugend and corresponding subaddend with a forced carry into the least significant digital order of each group, said group carry outputs being generated simultaneously for all groups, and means for each group directly and simultaneously responsive to the group carry outputs from all groups of lower digital order for selecting the subsums corresponding to the true subsums.

4. In a logical adder, the combination of input means for supplying voltage signals representative of augend and addend digits; output means the voltage states of which represent sum digits, said input and output means being divided into a plurality of major digit groups, each of said major digit groups in turn being divided into a plurality of minor digit groups, each of the minor digit groups thereby having input means for supplying voltage signals representative of a subaugend and a corresponding subaddend and output means the voltage states of which represent true subsum digits; first means associated with each of said minor digit groups responsive to said subaugend and subaddend input means for producing voltage signals representative of a first subsum and a first minor digit group carry output, said first minor digit group carry output being generated simultaneously for all minor digit groups; second means associated with each of said minor digit groups responsive to said subaugend and subaddend input means for producing simultaneously with said first means voltage signals representative of a second subsum higher by one than said first subsum and for producing an associated second minor digit group carry output, said second minor digit group carry output being generated simultaneously for all minor digit groups; means associated with each of said major digit groups responsive to the minor digit group carry output signals from the respective minor digit groups therein for producing simultaneously from each of said major digit groups a first and a second major digit group carry output, said first major digit group carry output being generated when all of said respective minor digit groups therein produce a second minor digit group carry output, and said second major digit group carry output being generated when the highest order minor digit group within the respective major digit group produces a first minor digit group carry output or when any given minor digit group within said respective major digit group produces a first minor digit group carry output while all higher order minor digit groups within said respective major digit group relative to said given group produce second minor digit group carry outputs; initial carry input means for producing a voltage signal representative of an initial carry input into the lowest order minor digit group within the lowest order major digit group of said logical adder; means within each of said major digit groups responsive to said major digit group carry output signals from all major digit groups of lower digital order and to said initial carry input signal for simultaneously generating a true carry input into each respective major digit group; and means associated with each minor digit group responsive to said true carry input into the associated major digit group and to minor digit group carry outputs of all minor digit groups of lower digital order within the respective major digit group to simultaneously select the subsum for each minor digit group corresponding to the true subsum.

References Cited in the file of this patent
UNITED STATES PATENTS

| | | |
|---|---|---|
| 2,861,744 | Schmitt et al. | Nov. 25, 1958 |
| 2,954,168 | Maddox | Sept. 27, 1960 |